United States Patent
Waters

[15] 3,669,030
[45] June 13, 1972

[54] MANUFACTURE OF TOFFEE AND SIMILAR PRODUCTS

[72] Inventor: Peter Donald Waters, Hayes, England

[73] Assignee: Callard & Bowser Limited, London, England

[22] Filed: March 17, 1970

[21] Appl. No.: 20,333

[30] Foreign Application Priority Data

March 20, 1969 Great Britain..................14,695/69

[52] U.S. Cl.............................................99/138, 15/246.5
[51] Int. Cl............................................A21d 8/00, A23p 1/00
[58] Field of Search.................107/1 R, 54 R, 40, 54 F, 30, 107/36, 38, 30 R, 30 B, 34, 14 C; 15/246.5; 259/99, 105, 2, 15, 18, 19, 31, 37, 7.51, 61, 74, 48, 49, 60, 74, 92; 99/134, 138 R, 139; 18/12 SM

[56] References Cited

UNITED STATES PATENTS

| | | | |
|---|---|---|---|
| 3,384,003 | 5/1968 | Sollich | 107/54 F X |
| 3,446,136 | 5/1969 | Recas | 107/54 R X |
| 3,486,469 | 12/1969 | Recas | 107/54 R |
| 3,557,717 | 1/1971 | Chivers | 107/8 X |

Primary Examiner—Jordan Franklin
Assistant Examiner—Geo. V. Larkin
Attorney—Stevens, Davis, Miller & Mosher

[57] ABSTRACT

A continuous process for manufacturing toffee is provided in which all the various stages of the traditional batch process of toffee-making are reproduced. An effective agitation of the sugar mixture in the second or cooking stage of the process is achieved by stirring the mixture and scraping it from the inner surfaces of the container using a stirrer-scraper which has no central axial shaft. Preferably the stirrer-scraper effects a major agitation of the sugar mixture in the cooking stage of the process by the provision of adjacent sections of helical blades, there being in each section an inner and an outer helical blade which are arranged to impart movement to the sugar mixture in opposite directions within each section.

17 Claims, 4 Drawing Figures

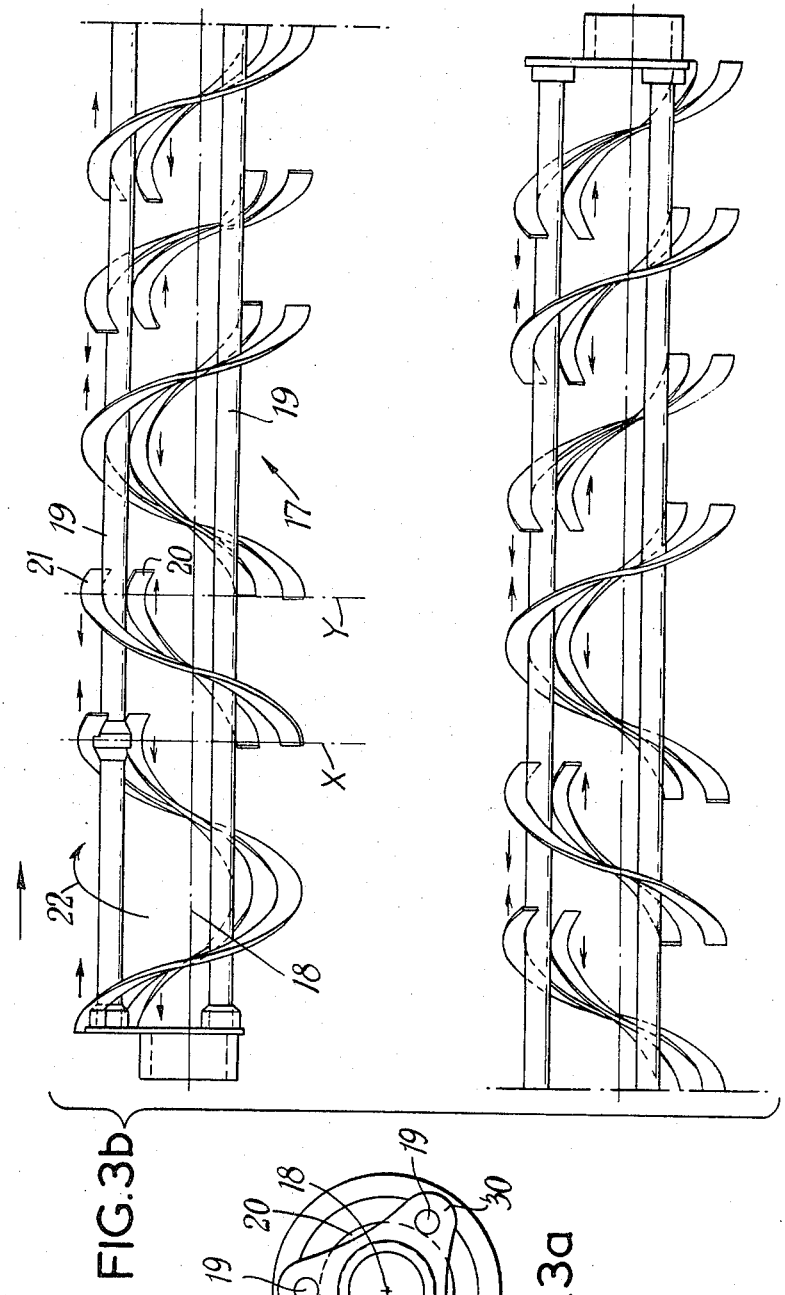
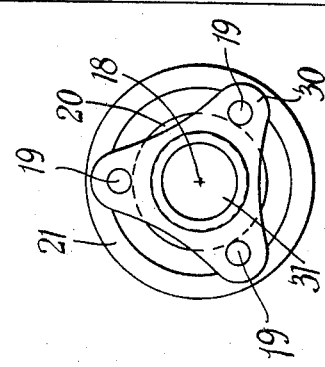
FIG.3b
FIG.3a

3,669,030

MANUFACTURE OF TOFFEE AND SIMILAR PRODUCTS

BACKGROUND OF THE INVENTION

The traditional process of making high quality candy or toffee (which latter expression is used herein to cover all confections based on boiled sugar) has been a batch process. This batch process involves heat treating a basic mixture, which preferably comprises mainly a sugar or sugars, glucose, vegetable fats and condensed milk, according to a well established sequence of temperature and other changes.

The first stage in the batch process for making toffee is to heat the sugar-based mixture (the pre-mix) commonly in steam-jacketed pans, with the lid closed in order to discourage loss of water. The mixture is heated until all the sugar is completely dissolved which occurs at a temperature of the order of 210° F. The lid of the steam-jacketed pan is then opened and the temperature is steadily raised to about 252° F so that the color and flavor changes take place at the same time that the water content is being reduced. This second stage of the process takes about 15–16 minutes after which the water content, the color and the flavor have all reached the desired stage at the same time.

If flavoring additives such as butter, liquorice, vanilla and mint are to be incorporated, these are added to the mixture after the rise in temperature to about 252° F, the mixture being held at approximately that temperature while the flavoring additives are being incorporated.

The resultant batch of hot viscous fluid toffee (which may or may not include flavoring additives) is then poured either into moulds or on to cooled tables from which, when furthermore, chilled, it is removed as finished toffee or as a plastic mass for further processing.

Although the toffee produced by such a traditional batch process is entirely satisfactory, close attention is required by an operator in order to control the changes of conditions and, furthermore, the intermittent output of the hot toffee from the batch vessel does not lend itself to steady, and therefore efficient, operation of the subsequent steps involved in pouring into the moulds or on to cooled tables for chilling, and in wrapping or other packaging procedures. It has therefore been evident for a substantial time that considerable economies could be made by turning the traditional batch process for making toffee into a continuous process.

Hitherto it has been considered impossible to reproduce the steps of this traditional batch process as a continuous process. Because this opinion has been held hitherto, previous attempts to provide a continuous toffee-making process have proceeded along different lines. The previous methods and apparatus for the continuous production of heated toffee of which we are aware have all comprised two distinct stages: the first stage being a rapid lowering of the water content to the proportion required in the finished toffee, and the second stage involving maintaining the temperature of the water-reduced mixture in conditions permitting little or no further loss of water until the desired color and flavor changes are complete. In our experience such processes, while having some of the merits of continuous working, do not produce toffee of a quality equal to that of toffee produced by the traditional batch process. We believe that this difference is due to adverse results of the two stage-process, which differs in many essentials from the stepless, smoothly progressive, reactions in the conventional batch process.

SUMMARY OF THE INVENTION

It is a main object of the present invention to provide a method and apparatus for manufacturing high-quality toffee by a continuous process rather than a batch process.

It is a further object of the present invention to provide a continuous process of manufacturing toffee in which all the stages of the traditional batch process are reproduced.

It is a still further object of the present invention to provide a novel toffee-making apparatus adapted for use in a continuous process.

It is a particular object of the present invention to provide a stirrer-scraper which is effective in the cooking stage of a toffee-making process to keep the sugar mixture continually moving to avoid burning of any parts of the mixture so that a uniform product is obtained.

In order to achieve these objects the present Applicant has been devoting considerable study to the problems of reproducing the stages of a batch process as a continuous process and thereby making toffee of a quality comparable with that obtainable from the traditional batch process.

Any continuous process is dependent for satisfactory working on a regular input, a similar regular output and a constant capacity of the vessels used in every stage of the process. When these conditions are fulfilled, the mixture under treatment is moved in sequence through the stages of the process and all parts of the mixture are subjected to the same treatment conditions for the same lengths of time. I have found that the difficulty in adapting the stages of a batch process to a continuous toffee-making process has arisen because of the stirrer which has to be present in the second or cooking stage of the process during which the mixture is heated from about 210° F to about 252° F with reduction in the water content. As the water is evaporated from the mixture, so the tendency for the mixture to adhere to any surface with which it is in contact increases. The mixture can be scraped from the inner surfaces of the heated container by continuously rotating a stirrer-scraper mounted on an axial shaft about which the stirrer-scraper rotates, but this axial shaft is a source of further build-up of congealing toffee. As soon as this build up commences, the capacity of the unit within which the second or cooking stage of the process is being performed decreases, so that the time spent by the mixture in this part of the apparatus is less and the quality of the toffee produced is changed. Also control of the process is lost because the mixing action is reduced and may even cease.

The build-up of congealing toffee on the axial shaft of the stirrer-scraper can be avoided if this shaft is heated. However, this possible remedy in itself gives rise to a further difficulty because any part of the mixture which comes into contact with and remains in contact with the heated shaft will burn to form carbon. It is not practicable to provide a scraper or any other means for preventing mixture from remaining in contact with the surface of the heated axial shaft of a stirrer-scraper, and therefore burning of parts of the mixture cannot be prevented when the axial shaft of the stirrer-scraper is heated.

Accordingly the objects of the present invention are achieved by providing a continuous process for manufacturing toffee in which the various stages of the traditional batch process are reproduced and in which an effective agitation of the mixture by stirring it and scraping it from the inner surface of the container in the second or cooking stage of the process is achieved by continuous rotation of a stirrer-scraper having no central axial shaft. In consequence, all the parts of the stirrer-scraper are continuously moving through the mixture, and there is a self-cleansing action of all the parts of the stirrer-scraper as a result of this continuous movement.

In accordance with the present invention therefore there is provided a method of manufacturing toffee comprising the steps of continuously feeding a mixture of toffee ingredients to a closed feeder unit from which evaporation of water is prevented, raising the temperature of the mixture during its passage through the closed feeder unit to a temperature at which all the ingredients of the mixture are dissolved, continuously feeding the mixture from the closed feeder unit to an open feeder unit from which water may be evaporated, and further increasing the temperature of the mixture during its passage through the open feeder unit to effect cooking of the ingredients and evaporation of water, whilst effectively agitating the mixture at all stages of its passage through the open feeder unit using a stirrer-scraper which is mounted so as to rotate about a central axis but which has, instead of a central axial shaft, two or more spindles arranged parallel to the axis of rotation but spaced from it, thereby ensuring that the mixture which is in contact with the sides of the open feeder unit is continuously changed, cooked toffee being obtained from the open feeder unit at a rate equal to the rate of feed of the mixture of toffee ingredients to the closed feeder unit.

Most advantageously the effective agitation of the mixture during its passage through the open feeder unit is obtained by using a stirrer-scraper in which outer and inner helical blades are carried by the spindles, the outer helical blade having an outer periphery at a distance from the central axis marginally smaller than the distance of an inner semi-circular surface of the open feeder unit from the central axis, both the inner and outer helical blades being divided into sections longitudinally of the open feeder unit, the adjacent sections of each helix imparting opposed movements to the mixture in forward and reverse directions respectively, and the inner and outer helical blades which any longitudinal section of the helical blade being effective to impart movement in opposite directions to the mixture with which they come respectively in contact.

In cases where rotational drive to the stirrer-scraper is provided from one end only of this unit it is preferred to employ three spindles equally spaced from the central axis in order to provide sufficient rigidity in the stirrer-scraper as a whole. However, four spindles may be used as an alternative which also gives good results.

In methods in accordance with the present invention in which it is desired to add a flavoring additive to the toffee, the cooked toffee which is obtained from the open feeder unit is continuously fed to a further open feeder unit together with a flavoring additive, and the resulting mixture is effectively agitated at all stages of its passage through the further open feeder unit using a stirrer-scraper essentially similar to that which is employed in the open feeder unit in which cooking of the ingredients takes place.

Conveniently cooked toffee is obtained from the open feeder unit after a predetermined residence period in the open feeder unit by fixing a weir at a particular level which is maintained the same whilst the rate of feed of the mixture of toffee ingredients to the closed feeder unit is maintained constant. Suitable adjustment of the weir setting thus ensures that any predetermined residence period may be maintained even though the rate of feed of the material to the open feeder unit varies.

In accordance with another aspect of the present invention there is provided novel toffee-making apparatus for performing a continuous toffee-making process in which the various stages of the traditional batch process are reproduced.

More specifically in accordance with this aspect of the present invention there is provided apparatus for manufacturing toffee by a continuous process, the apparatus including an open feeder unit which comprises a trough having a lower internal surface which is semi-cylindrical, jackets surrounding at least the outer surface corresponding to the internal semi-cylindrical surface of the trough for passing a heating fluid into contact with the said outer surface, and a stirrer-scraper mounted within the trough for rotation therein about the axis of the internal semi-cylindrical surface for scraping material from the internal semi-cylindrical surface, the stirrer-stripper consisting essentially of a plurality of spindles offset similar distances from the axis of the internal semi-cylindrical surface of the trough, a first helical blade mounted to extend outwardly from the said spindles, the first helical blade having a plurality of discontinuities therein so that there are separate sections of the first helical blade lengthwise of the trough, adjacent sections of the first helical blade having the helix wound in opposed directions, a second helical blade mounted on the spindles to extend inwardly from the spindles, the second helical blade having discontinuities similar to the discontinuities in the first helical blade and each section of the second helical blade having the helix wound in the opposite direction to the corresponding section of the first helical blade, and radial means for transmitting rotary movement about the axis of the internal semi-cylindrical surface of the trough to the spindles and the first and second helical blades mounted thereon.

Preferably the discontinuities in the first and second helical blades and the lengths of the sections of the first and second helical blades are so arranged that no substantial overall movement in a direction parallel to the said axis is imparted to material within the trough upon rotation of the stirrer-scraper.

In the embodiment of the invention which will be described the discontinuities and the lengths of the sections of each helical blade correspond, for the first helical blade, to approximately 4½ turns of the helix in a first direction and 2½ turns in the second direction and, for the second helical blade, to approximately 2½ turns of the helix in the first direction and 4½ turns of the helix in the second direction. The specific embodiment of the apparatus has these turns in the respective helices spread over 10 separate sections.

Preferably the stirrer-scraper has three spindles each of which is set at each end in an end plate having a central aperture, at least one of the end plates comprising the radial means for transmitting rotary movement to the spindles.

The present invention further comprehends confections such as toffee made by the method of the present invention.

DESCRIPTION OF VIEWS OF THE DRAWINGS

The invention will be better understood from the following detailed description of a preferred embodiment thereof which is made by way of example with reference to the accompanying drawings, in which:

FIG. 3a is an end view of the stirrer-scraper illustrated in plan view in FIG. 3b; and FIG. 3b is an enlarged plan view of the stirrer-scraper of FIG. 2 separated from the remainder of the apparatus of that figure.

DETAILED DESCRIPTION

Figure 1:
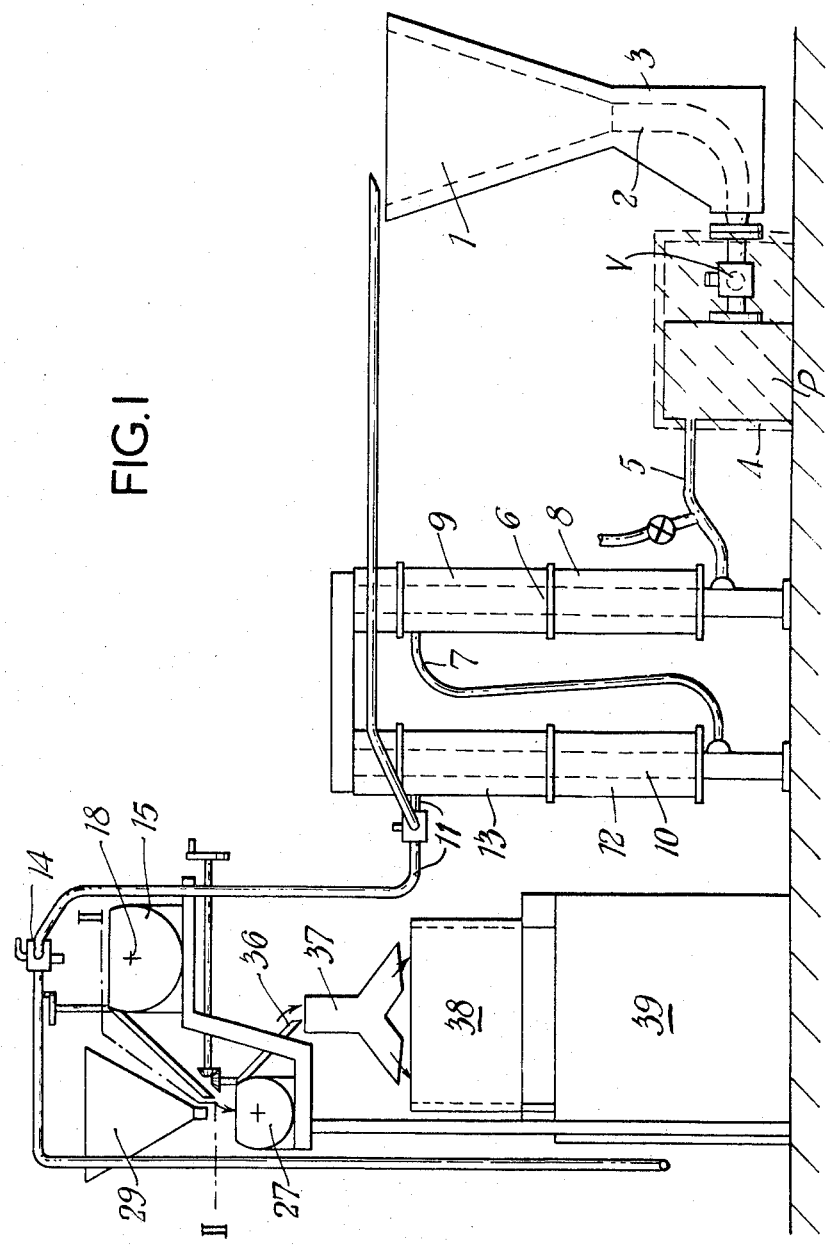
FIG. 1 is a side elevational view of apparatus for carrying out a continuous process of toffee-making in accordance with the present invention.

In the drawings the same or similar parts are designated by like reference numerals.

Referring to FIG. 1 of the accompanying drawings, there is shown a pre-mix hopper 1 in which the main toffee-making ingredients are held together in the form of a sugar mixture (known as the pre-mix). The main ingredients of the sugar mixture advantageously include glucose and vegetable fats, which are introduced into the hopper 1 at a temperature of the order of 110° F, sugar and condensed milk. After charging the hopper 1, the pre-mix is discharged from the hopper under gravity through a tube 2 which, together with the hopper, is enclosed in a water jacket 3 which maintains the tube 2 and its contents at a temperature of the order of 110° F.

The pre-mix is then passed through a valve V into a metering pump P which is also enclosed in a water jacket 4 to maintain the contents of the pump P at a temperature of the order of 110° F, and which may be set to deliver the pre-mix at any desired rate.

The output from the metering pump P is directed along a conduit 5 into the lower end of a vertical closed and heated dissolver tube 6 and the pressure with which the pre-mix is fed to the dissolver tube 6 causes the sugar mixture which is already in the dissolver tube 6 to be moved progressively upwards in the dissolver tube 6 until it reaches the level at which a conduit 7 is joined to the dissolver tube 6 as an outlet. The dissolver tube 6 is enclosed within a series of steam jackets such as steam jackets 8 and 9 which are effective to raise the temperature of the sugar mixture as it is advanced upwardly through the vertical dissolver tube 6.

Adjacent to the vertical dissolver tube 6 there is positioned a second vertical closed dissolver tube 10 which has an inlet from the conduit 7 at its lower end and an outlet to a conduit 11 at its upper end. Steam jackets such as steam jackets 12 and 13 enclose the second vertical dissolver tube 10 so that there is similarly an increase of temperature imposed upon the sugar mixture being advanced upwardly through the second vertical dissolver tube 10 under pressure from the conduit 7 and the metering pump P. The temperature gradient imposed by the steam jackets 8, 9, 12 and 13 is such that, when the sugar mixture reaches the level of the outlet to conduit 11, it has reached a temperature of at least 206° F and preferably a temperature of 210° F.

Apart from the connections to conduits 5, 7 and 11, the vertical dissolver tubes 6 and 10 are completely enclosed so that the evaporation of water from the sugar mixture in the dissolver tubes 6 and 10 is prevented. In these circumstances the gradual increase in temperature of the sugar mixture to a temperature of at least 206° F during its passage through the two dissolver tubes 6 and 10 is effective to dissolve all the soluble ingredients. The selection of a temperature in the range of 206°–210° F for the material as it leaves the dissolver tube 10 ensures that the sugar mixture which is fed along outlet conduit 11 is a completely liquid mixture in which no particles of solid are present, the fats being dispersed throughout the mixture.

Both the vertical dissolver tubes 6 and 10, which together comprise a closed feeder unit, preferably include continuously rotating feed augers arranged to assist the upward movement of the sugar mixture under the applied pressure from the metering pump P, as well as effecting a stirring of the sugar mixture as it is advanced.

The use of two vertical dissolver tubes 6 and 10 is a matter of convenience only and in other circumstances the two vertical dissolver tubes may be re-placed by either a single dissolver tube, which may be vertical or horizontal, or a series of such tubes.

Figure 2:
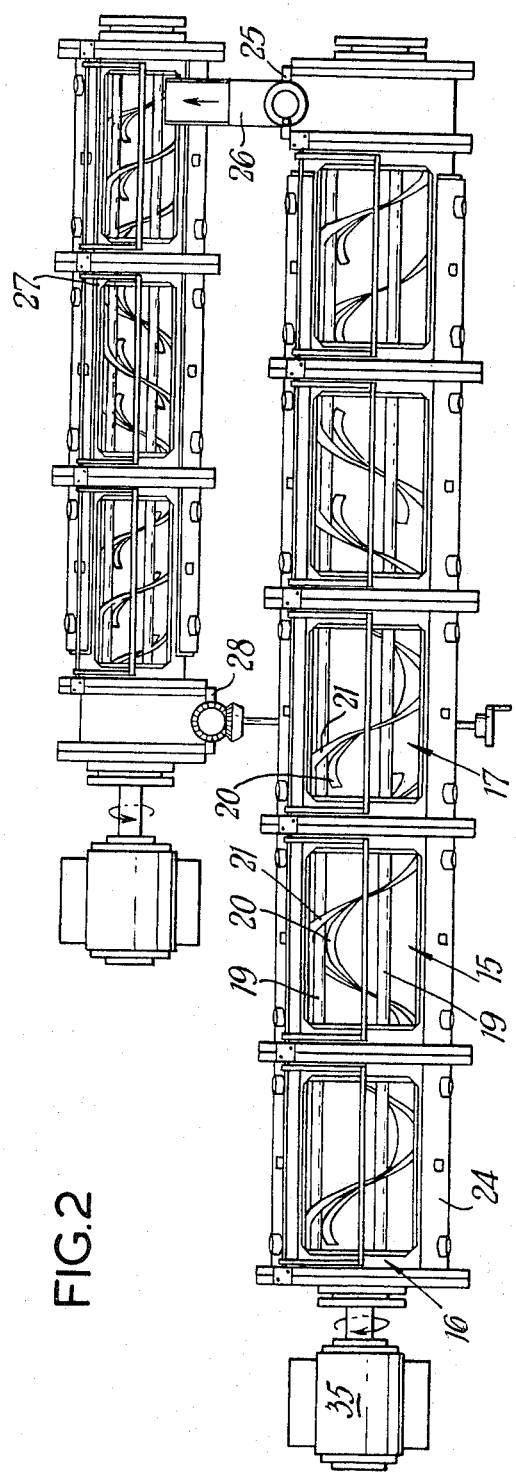
FIG. 2 is a plan view of part of the apparatus of FIG. 1 taken along the line II—II.

The liquid sugar mixture emerging at the upper end of the vertical dissolver tube 10 is forced upwardly under pressure through the conduit 11 to a three-way tap 14. The tap 14 is positioned over one end of an open trough 15 so that when the tap 14 is opened in the appropriate direction, the liquid sugar mixture at a temperature of the order of 210° F is fed into the left hand end of the open trough 15, (as seen in FIG. 2), the feed being delivered substantially at the position indicated by the arrow 16 in FIG. 2.

The open trough 15, as shown in FIG. 1, has a lower semi-cylindrical cross-section, and a stirrer-scraper 17 (see FIG. 2) is mounted for rotation within the open trough 15.

The stirrer-scraper 17 has the essential feature that it is constructed to be capable of revolving about a central axis 18 of the semi-cylindrical lower section of the trough 15, but it has no central shaft co-incidental with the central axis 18.

In accordance with a preferred construction of the stirrer-scraper 17 this includes three spindles 19 (shown in the end view of FIG. 3a) extending longitudinally of the trough 15 and parallel to the central axis 18. The three spindles 19 are all equally spaced from the central axis 18, and the spindles carry inner and outer helical blades 20 and 21. The outer helical blade 21 is mounted on the outer surfaces of each of the spindles 19 so as to extend very close to the inner surface of the semi-cylindrical trough 15, there being a clearance of less than one-sixteenth of an inch (preferably the clearance is of the order of one one-hundredth of an inch). The inner helical blade 20 is mounted on the innermost portions of the circumferences of the spindles 19.

The stirrer-scraper 17 is shown more clearly in FIGS. 3a and 3b which consists of two enlarged views of the stirrer-scraper 17 removed from the open trough 15, an end view being given at FIG. 3a and a plan view at FIG. 3b. Referring to FIG. 3a, the end-view of the stirrer-scraper 17 shows the three spindles 19 mounted in an end-plate 30 which has a central aperture 31 and which acts to transmit a rotary drive from a motor 35 to the spindles 19 and the helical blades 20 and 21 mounted on them. Now referring to FIG. 3b, the view of the stirrer-scraper 17 shows clearly that a series of discontinuities is present in both the inner and outer helical blades 20 and 21 so that there are separate sections of both helical blades, the lengths of both the inner and outer helical blades in each section being similar, but the lengths of the actual sections varying.

In accordance with a feature of the preferred embodiment of the present invention, the inner and outer helical blades 20 and 21, when considered as a whole, impart to the sugar mixture no substantial movement in a direction longitudinal of the open trough 15. That is to say, although all the individual sections of each helical blade do impart either a forward or a backward movement upon the sugar mixture with which they come in contact, the aggregate effect of all the sections of both the inner and outer helical blades 20 and 21 is to impart no resultant movement to the sugar mixture in either a forward or a backward direction. However, an arrangement of the sections of the helical blades 20 and 21 to give a small resultant movement in a forward direction is acceptable.

The inner and outer helical blades 20 and 21 are constructed so that each of their sections causes a considerable agitation of the sugar mixture upon rotation of the stirrer-scraper 17. Most advantageously, this considerable agitation is effected by constructing the inner helical blade 20 so as to impart to the sugar mixture in the open trough 15 a movement in the direction opposite from that imparted by the immediately adjacent outer helical blade 21. By this method the agitation of the mixture results in a continual replacement of the mixture which is in contact with the walls of the trough 15, which are heated as will be described below, and there is a good transfer of the heat from the walls throughout the mixture in the trough 15.

As may be readily seen in FIG. 3b, the stirrer-scraper 17 comprises ten separate sections of the inner and outer helical blades 20 and 21, there being a discontinuity in the blades between each section. The arrow 22 in FIG. 3 indicates the direction of rotation of the stirrer-scraper 17 and the horizontal arrows immediately adjacent to different sections of the inner and outer helical blades 20 and 21 indicate the longitudinal direction of movement imparted to the sugar mixture by these different sections of the inner and outer helical blades 20 and 21. It will be observed that, in each section of the inner and outer helical blades 20 and 21, the outer helical blades 21 generates a movement in the sugar mixture in the opposite direction to the direction of movement generated by the inner helical blade. For example, in the first section from the left-hand end of the stirrer-scraper 17 as seen in FIG. 3b, the outer helical blade 21 imparts to the sugar mixture a movement to the right whereas the inner helical blade 20 imparts a movement to the left.

Approximately at the line "X" there is a discontinuity in both the inner and outer helical blades 20 and 21. In the second section of these helical blades 20 and 21, approximately between lines X and Y, the helices are reversed so that the outer helix 21, for the direction of rotation indicated by the arrow 22, imparts to the sugar mixture a movement towards the left, whereas the inner helical blade 20 imparts to the sugar mixture a movement to the right. These directions of movement, indicated by the horizontal arrows, are reversed for each successive section along the length of the stirrer-scraper 17.

In the example of stirrer-scraper 17 shown in the accompanying drawings, the sections of helical blade in the aggregate provide approximately 4½ turns of helix giving movement to the right and 2½ turns giving movement to the left for the outer helical blade 21, and 2½ turns of helix giving movement to the right and 4½ turns giving movement to the left for the inner helical blade 20. The overall lengths of the trough 15 and the stirrer-scraper 17 in this example are approximately 8 ft. 9 inches and 8 ft. 8½ inches respectively, and the outer diameter of the outer helical blade 21 is 12 inches.

The open trough 15 is steam jacketed at 24 so that the temperature of the sugar mixture in the open trough 15 is gradually increased from the temperature of approximately 210° F at the input end near the position 16, to a temperature of the order of 252° F at the right hand end of the trough 15 as seen in FIG. 2. At the right hand end of the open trough 15 there is an adjustable weir 25 and during the continuous operation of the process in accordance with this invention the sugar mixture is advanced through the open trough 15 by the net effect of the inflow at 16 and the overflow over the weir 25.

The weir 25 is kept at a fixed level for any particular rate of feed of sugar mixture through the continuous process, the level of the weir 25 being chosen to determine the residence period of the mixture in the trough 15 which is the open feeder unit in which cooking of the mixture takes place. If a different residence period is required for the same rate of feed of sugar mixture then the level of the weir 25 will be adjusted. Similarly, if the rate of feed of sugar mixture is changed but the same residence period is required then the level of the weir 25 will be altered.

The weir 25 has a particular use when the continuous process is being closed down, for example for cleaning. When the feed of mixture to the open trough 15 is cut off, the same residence period for the majority of the mixture remaining in the trough 15 can still be obtained by lowering the weir 25 steadily at the appropriate rate.

As already stated, the stirrer-scraper 17 has no substantial net advancing or retarding effect on the flow of the sugar mixture in the trough 15. During the movement of the sugar mixture along the open trough 15, with the gradual increase in temperature from 210° to 252° F, water is evaporated and the ingredients of the mixture are cooked to the desired color and flavor.

It is found that, in use of this apparatus in a continuous process, the cooked toffee mixture which flows out of the open trough 15 at the weir 25 is of a very uniform color, and this uniform color is evidence that all parts of the sugar mixture are treated for essentially the same length of time during the passage of the sugar mixture through the open trough 15.

If no additional flavor is to be included in the cooked toffee mixture this may be taken straight from the open trough 15 at the weir 25 via a chute 26 and put into moulds or on to cooled tables for cooling and further processing, such as wrapping.

However, in the embodiment of the invention illustrated in FIG. 2, a further open trough 27 is shown which is essentially similar to the open trough 15. The further open trough 27 is fed by the chute 26 and has for an outlet an adjustable weir 28 similar to the weir 25. The open trough 27 includes a stirrer-scraper similar in construction to the stirrer-scraper 17, but shorter in length so as to accommodate to the length of the open trough 27.

In addition to the feed of cooked toffee mixture into the right hand end of the open trough 27 an additional flavor is also added to the mixture in the open trough 27 using a feed hopper 29 (see FIG. 1). The open trough 27 is steam jacketed so as to maintain the mixture in it, during the blending or flavoring stage of the continuous process, at a temperature preferably of the order of, but no higher than, that at which the mixture is delivered from the trough 15 to the trough 27. Because of the addition of cool flavoring compound, there will tend to be a slight reduction in temperature, for example from 253° to 251° or 249° F, during the passage through the trough 27. This reduction in temperature prevents further substantial loss of water and avoids the possibility of super-saturation in the mixture.

The blended mixture which flows from the trough 27 over the weir 28 passes down a chute 36, through a feeder 37 to a deposit hopper 38 into moulds in which the individual toffees are cooled as they traverse the path of an endless belt (not shown), first on a level with the deposit hopper 38 and then on the lower level of a second cooling tunnel 39.

The various parts of the apparatus for continuously making toffee are dimensioned such that the sugar mixture spends a time of the order of 7 minutes in the closed feeder unit which consists of the two vertical dissolver tubes 6 and 10 and has a residence period of the order of 13 – 17 minutes (preferably 15 minutes) in the open trough 15 which constitutes the main cooking stage of the process. The mixture has a residence period of the order of 3 minutes in the open trough 27 which constitutes the blending or flavoring stage of the process. The stirrer-scraper 17 is preferably rotated at a speed of the order of 50 revolutions per minute.

The inner and outer helical blades 20 and 21 are preferably constructed to have at least their surfaces of phosphor bronze, while the spindles 19 on which the helical blades are mounted are advantageously of stainless steel. The continuous rotation of the spindles 19 through the sugar mixture as this is cooked effectively ensures that there is no build-up of mixture on the spindles 19 which find their own temperature level in the mixture in the trough 15.

In one embodiment of the apparatus illustrated in the figure of the accompanying drawings a through-flow of 900 lbs. of sugar mixture per hour has been found to give an excellent quality of toffee when treated in the various stages of the apparatus for the times mentioned above.

In FIG. 1 of the accompanying drawings there are shown additional conduits and taps which are provided for use during the closing down of the process, its subsequent staring up, or cleaning of the apparatus. However, only those conduits denoted by numbers are operative when the process is running as a continuous process.

By the use, in the cooking and blending stages of our continuous process, of a stirrer-scraper as described above and illustrated in the accompanying drawings, we are able to reproduce all the stages of the traditional batch process and obtain a uniform product of high quality fully comparable to the product of the traditional batch process.

One particular commercial advantage of the continuous process lies in the regular output from the process and the consequent substantial increase in efficiency in the subsequent stages of cooling and wrapping the toffee.

It is to be understood that the invention is not restricted to the manufacture of toffee but that it may be usefully applied to other confections based on boiled sugar.

I claim:

1. A method of manufacturing toffee comprising the steps of continuously feeding a mixture of toffee ingredients to a closed feeder unit from which evaporation of water is prevented, raising the temperature of the mixture during its passage through the closed feeder unit to a temperature at which all the ingredients of the mixture are dissolved, continuously feeding the mixture from the closed feeder unit to an open feeder unit from which water may be evaporated, and further increasing the temperature of the mixture during its passage through the open feeder unit to effect evaporation of water and cooking of the ingredients, while effectively agitating the mixture throughout the open feeder unit by stirring and scraping said mixture in at least one substantially helical path in said open feeder unit, thereby ensuring that the mixture which is in contact with the sides of the open feeder unit is continuously changed, cooked toffee being obtained from the open feeder unit at a rate equal to the rate of feed of the mixture of toffee ingredients to the closed feeder unit.

2. A method according to claim 1 in which the step of effectively agitating the mixture through the open feeder unit comprises providing a stirrer-scraper having outer and inner helical blades carried by the spindles, the outer helical blade having an outer periphery at a distance from the central axis marginally smaller than the distance of the inner semi-cylindrical surface of the open feeder unit from the central axis, both the inner and outer helical blades being divided into sections longitudinally of the open feeder unit, the adjacent sections of each helix capable of imparting opposed movements to the mixture in forward and reverse directions respectively, and the inner and outer helical blades within any longitudinal section of each helical blade being effective to impart movement in opposite directions to the mixture with which they come respectively in contact.

3. A method according to claim 1 wherein the cooked toffee which is obtained from the open feeder unit is continuously fed to a further open feeder unit together with a flavoring additive, and the resulting mixture is effectively agitated at all stages of its passage through the further open feeder unit.

4. A method according to claim 1 in which cooked toffee is obtained from the open feeder unit after a residence period therein which is predetermined by fixing a weir at a particular level which is maintained the same while the rate of feed of the mixture of toffee ingredients to the closed feeder unit is maintained constant.

5. Apparatus for manufacturing toffee by a continuous process, the apparatus including an open feeder unit which comprises a trough having a lower internal surface which is semi-cylindrical, jackets surrounding at least the outer surface corresponding to the internal semi-cylindrical surface of the trough for passing a heating fluid into contact with the said outer surface, and a stirrer-scraper mounted within the trough for rotation therein about the axis of the internal semi-cylindrical surface for scraping material from the internal semi-cylindrical surface, the stirrer-scraper consisting essentially of a plurality of spindles offset similar distances from the axis of the internal semi-cylindrical surface of the trough, a first helical blade mounted to extend outwardly from the said spindles, the first helical blade having a plurality of discontinuities therein so that there are separate sections of the first helical blade lengthwise of the trough, adjacent sections of the first helical blade having the helix wound in opposed directions, a second helical blade mounted on the spindles to extend inwardly from the spindles, the second helical blade having discontinuities similar to the discontinuities in the first helical blade and each section of the second helical blade having the helix wound in the opposite direction to the corresponding section of the first helical blade, and radial means for transmitting rotary movement about the axis of the internal semi-cylindrical surface of the trough to the spindles and the first and second helical blades mounted thereon.

6. Apparatus according to claim 5 wherein the discontinuities in the first and second helical blades and the lengths of the sections of the first and second helical blades are so arranged that no substantial overall movement in a direction parallel to the said axis is imparted to material within the trough upon rotation of the stirrer-scraper.

7. Apparatus according to claim 6 in which the discontinuities and the lengths of the sections of each helical blade correspond, for the first helical blade, to approximately 4½ turns of the helix in a first direction and 2½ turns in the second direction and, for the second helical blade, to approximately 2½ turns of the helix in the first direction and 4½ turns of the helix in the second direction.

8. Apparatus according to claim 7, in which the total turns in each helix are divided into 10 sections.

9. Apparatus according to claim 5 wherein there are three spindles each of which is set at each end in an end plate having a central aperture, at least one of the end plates comprising the radial means for transmitting rotary movement to the spindles.

10. Apparatus according to claim 5 in which the trough includes an adjustable weir whereby, in order to compensate for desired changes in the rate of feed of material to the trough, the level of a material passing through the open trough may be varied while maintaining constant the residence period of material passing through the trough.

11. Apparatus according to claim 5 further including a pair of closed vertically disposed tubes through which a sugar mixture may be passed sequentially while raising its temperature to dissolve the mixture, and conduit means leading from the outlet of the second vertically disposed tube to an inlet at one end of the open feeder unit.

12. Apparatus according to claim 5, comprising a further open feeder unit, means for continuously feeding the cooked toffee which is obtained from the open feeder unit to the further open feeder unit together with a flabouring additive, the further open feeder unit including a stirrer-scraper essentially similar to that which is employed in the open feeder unit in which cooking of the ingredients takes place, whereby the resulting mixture is effectively agitated at all stages of its passage through the further open feeder unit.

13. Apparatus for the continuous manufacture of toffee comprising a closed feeder unit from which evaporation of water is prevented, an open feeder unit from which water may be evaporated, means for continuously feeding a mixture of toffee ingredients to the closed feeder unit and for continuously feeding the mixture from the closed feeder unit to the open feeder unit, means for raising the temperature of the mixture during its passage through the closed feeder unit to a temperature at which all the ingredients of the mixture are dissolved and means for further increasing the temperature of the mixture during its passage through the open feeder unit to effect evaporation of water and cooking of the ingredients, the open feeder unit comprising a stirrer-scraper which is rotatably mounted in said open feeder and comprises a plurality of spindles arranged parallel to but spaced from the axis of rotation, the stirrer-scraper capable of ensuring that the mixture which is in contact with the sides of the open feeder unit is continuously moved.

14. Apparatus according to claim 13, in which the stirrer-scraper has outer and inner helical blades carried by the spindles, the outer helical blade having an outer periphery at a distance from the axis of rotation of said stirrer-scraper marginally smaller than the distance of the inner surface of the open feeder unit from the central axis, said inner surface of the open feeder being a semi-cylindrical surface, both the inner and outer helical blades being divided into sections longitudinally of the open feeder unit, the adjacent sections of each helix capable of imparting opposed movements to the mixture in forward and reverse directions respectively, and the inner and outer helical blades within any longitudinal section of each helical blade being effective to impart movement in opposite directions to the mixture with which they come respectively in contact.

15. Apparatus according to claim 13, wherein there are three spindles each of which is set at each end in an end plate having a central aperture, at least one of the end plates comprising the radial means for transmitting rotary movement to the spindles.

16. Apparatus according to claim 13, wherein the closed feeder unit comprises a pair of closed vertically disposed tubes through which a sugar mixture may be passed sequentially while raising its temperature to dissolve the mixture, and conduit means leading from the outlet of the second vertically disposed tube to an inlet at one end of the open feeder unit.

17. Apparatus according to claim 13, comprising a further open feeder unit, means for continuously feeding the cooked toffee which is obtained from the open feeder unit to the further open feeder unit together with a flavoring additive, the further open feeder unit including a stirrer-scraper essentially similar to that which is employed in the open feeder unit in which cooking of the ingredients takes place, whereby the resulting mixture is effectively agitated at all stages of its passage through the further open feeder unit.

* * * * *